Oct. 22, 1946.   E. J. MARTIN ET AL   2,409,876

SHAFT TORSION MEASURING MEANS

Filed March 7, 1942

Inventors
Edward J. Martin,
Carl E. Grinstead &
Robert N. Frawley.
By
Blackmore, Spencer & Flint
Attorneys Patented Oct. 22, 1946

2,409,876

UNITED STATES PATENT OFFICE 2,409,876

SHAFT TORSION MEASURING MEANS

Edward J. Martin, Pleasant Ridge, Mich., Carl E. Grinstead, West Hartford, Conn., and Robert N. Frawley, Detroit, Mich., assignors to General Motors Corporation, Detroit, Mich., a corporation of Delaware Application March 7, 1942, Serial No. 433,820

5 Claims. (Cl. 73—68)

This invention relates to measuring apparatus and more specifically to means for measuring quantities of rotating force such as torque or angular acceleration. In many instances it is of course necessary to measure various characteristics of rotatable means and to use changes in inductance or capacity of certain parts to determine torque, etc. However, in these instances it is necessary to transfer or conduct changes in the electrical quantities so altered or changed in the rotating parts themselves to some stationary measuring apparatus. It has been common practice to transfer electrical currents from rotating means to stationary apparatus by slip rings or commutators, but in many instances where the values of the current transferred are very small and of necessity the variation in these currents is also minute, the resistance caused by the slip rings or commutators, both frictional and electrical, is so large and variable as to cause errors in the readings which will make the latter unsatisfactory.

It is therefore an object of our invention to provide means for transferring from rotatable apparatus to stationary measuring apparatus quantities of electrical energy representative of different characteristics of the rotating means without direct conductive paths.

It is a further object of our invention to provide electrical coupling means between rotatable and stationary apparatus which will not introduce any mechanical friction between the two or any electrical resistance in the coupling.

With these and other objects in view, which will become apparent as the specification proceeds, the embodiments of our invention will be best understood by reference to the following specification and claims and the illustrations in the accompanying drawing, in which:

Figure 1:
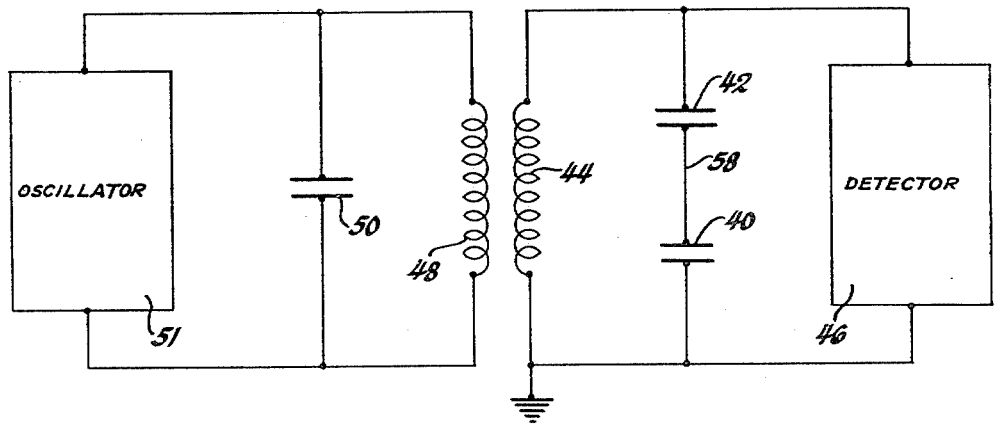
Figure 1 is a schematic wiring diagram of the circuit of our invention.

In Figure 1 is shown an electrical system in which the rotary characteristics of a shaft are detected by variations in a capacitance such as 40 which is then coupled to stationary measuring means by capacity transfer means as shown at 42. These two means are connected in a series circuit and are connected directly across the secondary 44 of a transformer which is connected to suitable detector means 46. The primary 48 of the transformer is connected in parallel with a capacity 50 to form a tuned circuit across an oscillator 51 to provide a desired frequency. Thus as the capacity of the condenser means 40 is varied due to rotary characteristic variation, such for example as torque, the tuning of the secondary circuit will be altered and the variation may be read by the detector means.

Figure 2:
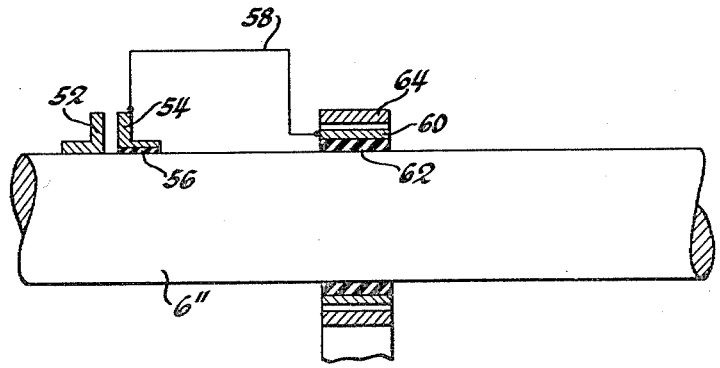
Figure 2 is a partial sectional view of capacity transfer means used with the system shown in Figure 1.

The physical transfer condenser 40 is shown in Figure 2 and comprises one plate 52 mounted directly on the rotating shaft 6'' and a second spaced plate 54 also mounted on the shaft but electrically insulated therefrom by a block 56 of insulating material. The plate 54 is electrically connected by line 58 with a conductive ring 60 concentrically mounted on shaft 6'' but spaced therefrom by a ring of insulating material 62. A third stationary ring 64 of conductive material is concentrically mounted around the outside of ring 60 and forms therewith a condenser to capacitatively transfer the energy changes in the condenser 40 to the measuring means.

The condenser 42 formed of the two rings 60 and 64 will have an appreciably larger capacity than the condenser 40 and therefore the frequency of the tuned circuit 40, 42 and 44 will only be slightly altered by the introduction of the series rotating condenser 42. It would also follow that slight changes in the capacity of condenser 42 will have very little effect on the tuned detector circuit. These points may be proved by assuming values for the condensers and calculating the resultant circuit.

Let C=capacity of the combined condensers in series and assume that condenser 40=50 mmf. and condenser 42=1000 mmf.

Then $$C=\frac{1}{\frac{1}{50}+\frac{1}{1000}}=\frac{1}{\frac{20}{1000}+\frac{1}{1000}}=\frac{1000}{21}=47.6 \text{ mmf.}$$

Thus the combination has a capacity of 47.6 instead of 50 mmf. with only the test condenser which change will have little effect on the tuning characteristics of the circuit.

Neither will the addition of the capacity 42 into the circuit alter the sensitivity thereof, that is, the response due to a change in the testing capacity 40.

Let us assume a ten percent change $\Delta C_{40}$ in the condenser 40, then the resultant combined capacity would be $$C + \Delta C = \frac{1}{\frac{1}{40 + \Delta C_{40}} + \frac{1}{42}}$$

where 40 and 42 are the two of the same values as those assumed above.

$$47.6 + \Delta C = \frac{1}{\frac{1}{50 + (50 \times .1)} + \frac{1}{1000}}$$

and by solving this equation we find $\Delta C = 4.5+$ and therefore $$\frac{\Delta C}{C} = \frac{4.5+}{47.6+} = 9.5$$

so that instead of a ten percent change in the capacity, we have a resultant 9.5 percent which for all practical purposes is the same.

Therefore, the addition of the transfer condenser into the circuit introduces very little effect in the tuning of the detector circuit and barely changes the sensitivity of the circuit, but does allow a transfer of energy without friction or resistance losses in the circuit.

We claim:

1. In measuring means for use on a rotatable member, capacitance means mounted on said rotatable member whose value will be altered upon a variation in the physical condition of said member, a circular ring mounted on the rotatable member but electrically insulated therefrom, connected to said capacitance means, a stationary ring concentrically mounted around the circular ring but spaced therefrom, electrical measuring means connected to said stationary ring whereby changes in the capacitance of the first-named means will be transmitted to the measuring means through the capacity of the condenser formed of the two concentric members.

2. In measuring means for use on a rotatable shaft, a condenser mounted on said shaft whose value will be altered depending upon the physical condition of said shaft, a circular ring mounted on the shaft but insulated therefrom electrically connected to the condenser, a second stationary ring mounted concentrically with respect to the first ring and spaced therefrom to provide a condenser and electrical measuring means connected to the stationary ring.

3. In measuring means for use on a rotatable shaft, a condenser mounted on said shaft whose value will be altered depending upon the physical condition of said shaft, a circular ring mounted on the shaft but insulated therefrom electrically connected to the condenser, a second stationary ring mounted concentrically with respect to the first ring and spaced therefrom to provide a condenser, a tuned circuit including the two condensers, and measuring means connected thereto to indicate the variation in current flow due to changes in the physical condition of the shaft.

4. In measuring means for use on a rotatable member, capacitance means mounted on said member whose value will be altered upon a variation in the physical condition thereof, a conductive part insulatably mounted on the rotatable member, a conductive stationary part mounted in juxtaposition to the rotatable part and forming therewith a capacity coupling and measuring means connected to the stationary part including an inductance whereby the capacitance means and the coupling condenser form a tuned circuit with the inductance for measuring.

5. In measuring means for use on a rotatable member, capacitance means mounted on said member whose value will be altered upon a variation in the physical condition thereof, a conductive part insulatably mounted on the rotatable member, a conductive stationary part mounted in juxtaposition to the rotatable part and forming therewith a capacity coupling, the capacity of the coupling condenser being appreciably higher than the capacity of the capacitance means, an inductance connected across the two capacitances in series to form a tuned circuit and detector means connected to the tuned circuit.

EDWARD J. MARTIN.
CARL E. GRINSTEAD.
ROBERT N. FRAWLEY.